United States Patent [19]

Stanley et al.

[11] Patent Number: 5,187,852
[45] Date of Patent: Feb. 23, 1993

[54] APPARATUS FOR ATTACHING A BUNGEE CORD TO A FASTENER

[75] Inventors: Johnny T. Stanley, Raleigh; Brian W. Roberts, Apex, both of N.C.

[73] Assignee: Delaware Capital Formation, Inc., Apex, N.C.

[21] Appl. No.: 776,792

[22] Filed: Oct. 15, 1991

[51] Int. Cl.5 .................. B23P 11/00; B65B 61/14
[52] U.S. Cl. .................. 29/243.57; 29/235; 29/451; 227/130
[58] Field of Search .............. 29/235, 243.56, 243.57, 29/283.5, 451; 92/152; 227/130; 53/417, 138.2, 138.4, 138.3

[56] References Cited

U.S. PATENT DOCUMENTS

| | | | |
|---|---|---|---|
| 3,237,290 | 3/1966 | Frank | 49/243.57 |
| 3,239,926 | 3/1966 | Tipper | 29/243.57 |
| 3,381,359 | 5/1968 | Schroeder | 29/243.57 X |
| 3,383,754 | 5/1968 | Klenz | 29/243.57 |
| 4,165,593 | 8/1979 | Niedecker | 29/243.57 X |

Primary Examiner—Timothy V. Eley
Attorney, Agent, or Firm—Allegretti & Witcoff, Ltd.

[57] ABSTRACT

An improved method for attaching a bungee cord to a fastener comprises folding over the end of the bungee cord and attaching a U-shaped metal clip thereto.

5 Claims, 4 Drawing Sheets

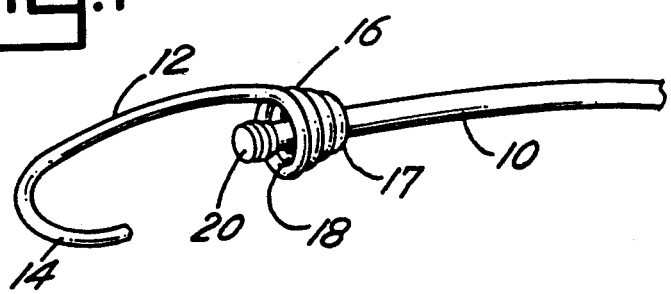
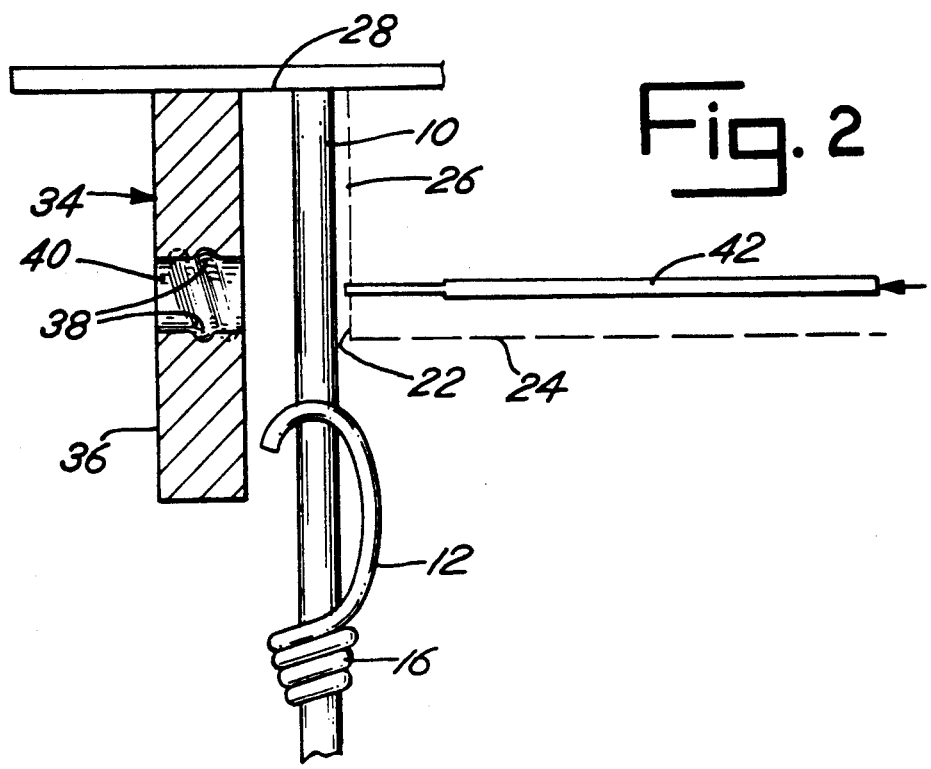
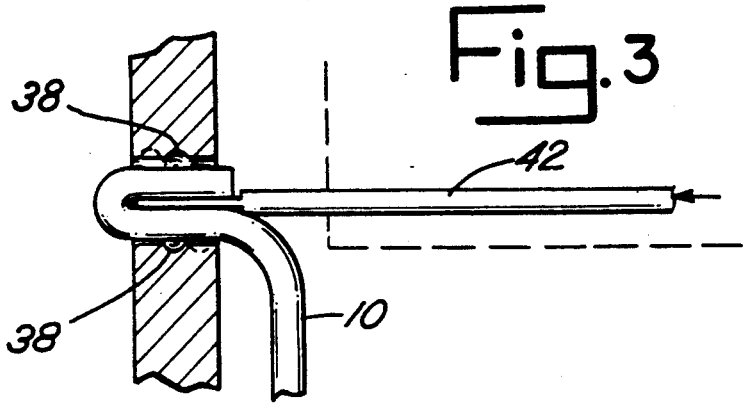

5,187,852

APPARATUS FOR ATTACHING A BUNGEE CORD TO A FASTENER

BACKGROUND OF THE INVENTION

This invention relates to an improved method for the manufacture of bungee cord fasteners.

Bungee cords are useful for strapping packages in place. Typically, a bungee cord might be used on a bicycle for holding a package or a brief case thereon. Bungee cords are also used to hold coverings in place, for example, on trucks or on automobiles.

A bungee cord comprises an elongated elastic cord or rope with a clip or fastener attached to each end of the rope. Generally, the clip or fastener is a steel wire which is formed in the shape of a spiral spring at one end and a hook at its opposite end as depicted in FIG. 1 of the drawings. During manufacture, the free ends of the elastic cord are put through the spiral spring ends of two fasteners or clips and knotted or otherwise enlarged to thereby retain the fastener. The end of the bungee cord may also be wrapped or otherwise modified after fitting through the end of the fasteners to facilitate retention. While this construction has proven to be useful and beneficial it does require a great deal of manufacturing time and cost. Thus, there has remained a need for an improved means for attaching an elongated flexible elastic cord to an end clip or fastener to form a bungee cord fastener.

SUMMARY OF THE INVENTION

In a principal aspect the present invention comprises an improved method for attachment of an elastic bungee cord to end fasteners. The method comprises positioning the cord through the fastener in the traditional manner, followed by folding the end of the bungee cord over upon itself and then attaching a U-shaped metal clip around the folded end of the bungee cord. This effectively creates an oversized "knot" or enlargement of the bungee cord end and prevents the bungee cord from being removed from the metal fastener. Apparatus for manufacture of such a bungee cord is also described. Such apparatus includes a jig which receives the end of the bungee cord. A punch folds the end of the bungee cord positioned within the jig over upon itself and also positions the folded end in a throat of a clipper of the type for attachment of a U-shaped metal clip. The punch is then withdrawn and a clip is attached by a means of the clipper.

Thus, it is an object of the invention to provide an improved method for manufacture of bungee cords and, more particularly, for the manufacture of a means for attaching of a bungee cord to a metal fastener at the end of the cord.

It is a further object of the invention to provide an improved apparatus for the manufacture of such a bungee cord;

Yet another object of the invention is to provide a mechanism which can safely attach a flexible bungee cord to a fastener in a highly automated, efficient, economical and safe manner.

These and other objects and advantages and features of the invention will be set forth in the detailed description which follows.

BRIEF DESCRIPTION OF THE DRAWING

In the detailed description which follows reference will be made to the drawing comprised of the following FIGURES:

FIG. 1 is a perspective view of a typical prior art bungee cord including an end fastener;

FIG. 2 is a schematic top plan view of the first step in the method of the present invention depicting the manner by which the end of an elastic bungee cord is positioned within the apparatus of the invention;

FIG. 3 is a schematic view of the next sequential step in the method of the attachment of the bungee cord to a fastener;

DESCRIPTION OF THE PREFERRED EMBODIMENT

Figure 4:
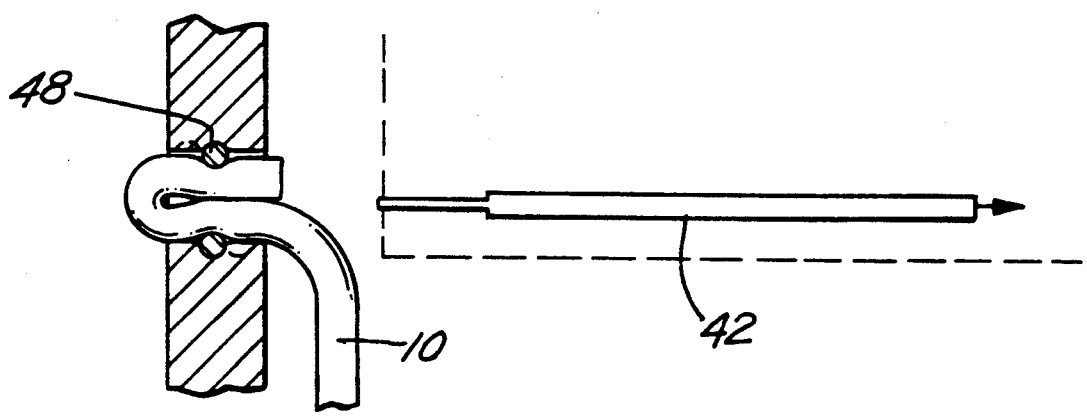
FIG. 4 is a schematic view of the next sequential step in the attachment of the bungee cord to a fastener.

FIG. 1 illustrates a typical prior art bungee cord configuration. An elastic bungee cord or rope 10 is joined with a fastener or clip 12. The fastener or clip 12 includes a hook end 14, which is designed to grip and thus retain the bungee cord construction, and a generally frustoconical spiral spring end 16 which receives the bungee cord 10. The spiral spring end 16 has a decreasing internal diameter so that at the narrow or small end 17 thereof, the bungee cord 10 will fit through the defined opening. The opposite end or enlarged end 18 of the spiral spring 16 configuration defines a pocket. The end 20 of the bungee cord is knotted, threaded or wrapped so that it becomes enlarged after having been inserted through the narrow end 17. In this manner, the end 18 fits within the pocket defined by the spiral spring portion 16 and is retained therein.

The present invention relates to a method and apparatus for providing an improved connection between the bungee cord 10 and the fastener 12 and, more particularly, relates to an improved method and apparatus for configuring the free end 20 of the cord 10. Thus, referring to FIGS. 2-4 there is illustrated the series of sequential steps associated with the improvement of the present invention. First, as depicted in FIG. 2 the bungee cord 10 is slidably received through the spring end of the fastener 12. This is similar to the manner of assembly in the prior art since the free end 20 of the bungee cord 10 is inserted through the opening defined by the spiral spring end or portion 16 of the fastener 12.

Figure 6:
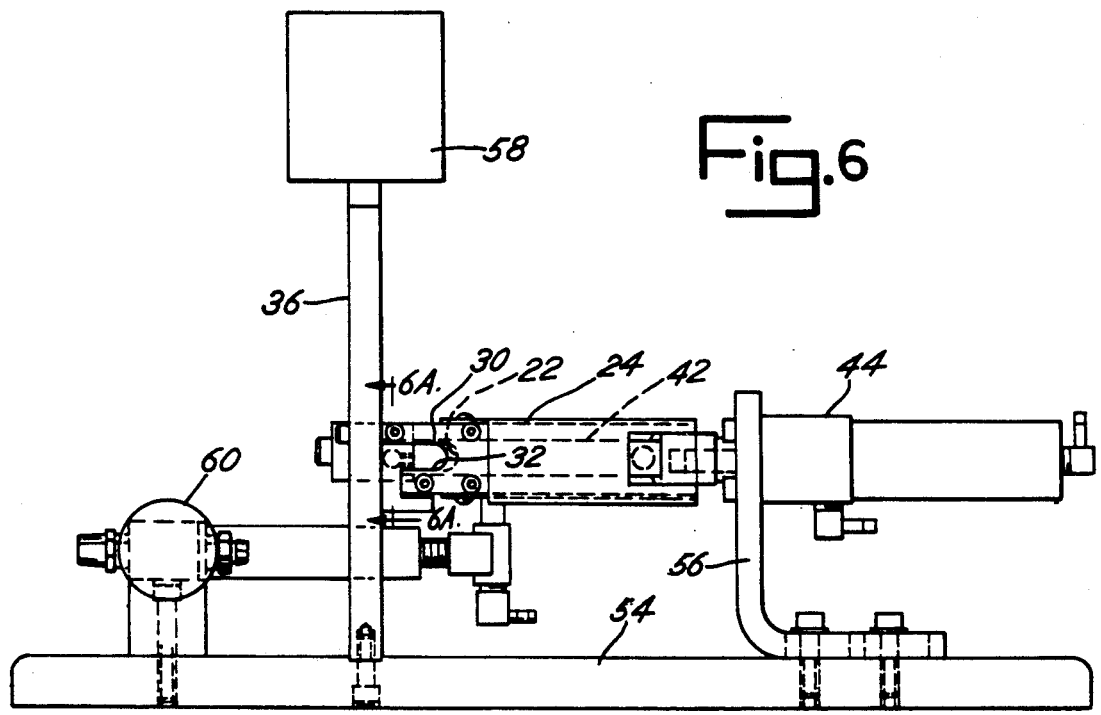
FIG. 6 is a front elevation view of the improved apparatus of the invention for the manufacture of a bungee cord with a fastener retained thereon.

The free end 20 is next fitted into a specially designed passage or opening 22 in a bungee cord jig or fixture 24. The opening 22 includes a sidewall 26, a back or end wall 28, and a top and a bottom wall 30 and 32 as illustrated in FIG. 6. The front and remaining side of the opening 22 are open.

Adjacent to the one open side of the opening 22 is a clipper 34. The clipper is of the type which is designed to apply U-shaped metal clips by cooperative interaction of a punch and die. An example of such a clipper is depicted in U.S. Pat. No. 3,383,754. The clipper includes a die plate 36 which defines a clip channel 38 that guide the legs of a U-shaped metal clip. Referring to FIG. 2, the legs of a clip will slide down the channel 38 to be guided about some material by means of a die 40 which is at the bottom of the channel 38.

Continuing to refer to FIG. 2 a bungee cord drive punch 42 is positioned in the side wall 26. The punch 42 is extensible in the direction of the arrow in FIG. 2 so as to engage the side of a bungee cord 10 in opening 22, again as depicted in FIG. 2.

Figure 6A:
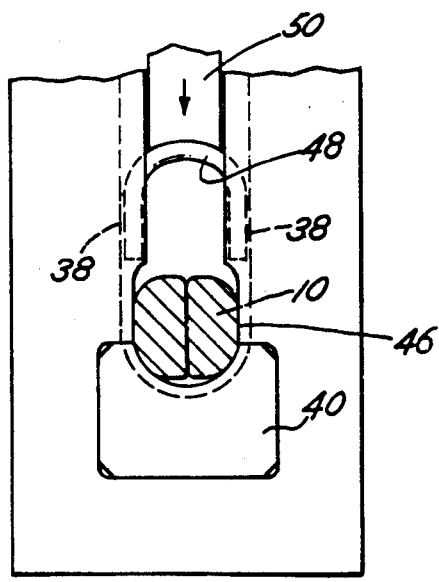
FIG. 6A is a partial cross sectional view illustrating the construction of the clipper mechanism used to attach a U-shaped metal clip to the end of a bungee cord in accord with the present invention.

Referring next to FIG. 3 the punch 42 is driven, for example, by means of an air cylinder 44 as shown in FIG. 6. It engages the cord 10 and causes the end of the cord 10 to fold over upon itself and to then be projected into an opening 46 between the channels 38. FIG. 6A illustrates the opening 46 into which the folded over bungee cord 10 is positioned.

Thus, continuing to FIG. 4, the next step in the operation of the method of the invention is retraction of the cord punch 42. Thereafter, a clip 48 will be moved downward through the channels 38 and engage about the end of the cord 10. Thus as shown in FIG. 6A a typical clip 48 slides within the channels 38 in response to driving force of a punch 50 so as to move downward and about the gathered end of the cord 10 for engagement and forming by the die 40. While this operation is being conducted, of course, the fastener 12 remains on the cord 10.

Figure 5:
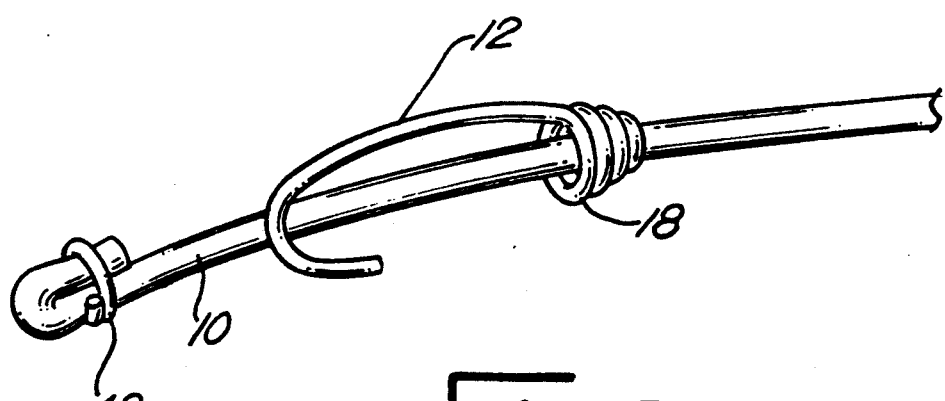
FIG. 5 illustrates in a perspective view the improved bungee cord assembly of the invention utilizing the method and apparatus of the invention.

After attachment of the clip 48 to the end of the cord 10, the assembly may be removed from the clipper to provide a product as depicted in FIG. 5. There it will be seen that the cord 10 includes a clip 48 about its folded end. The fastener 12 may then be slidingly moved along the length of the cord 10 and the expanded or folded end of the cord 10 will fit within the large diameter end 18 of the fastener 12. In this manner, an improved bungee cord assembly is provided by means of an improved method of assembly.

FIGS. 6 through 9 illustrate in greater detail the construction of the apparatus utilized for performing the method of the invention. Referring to FIGS. 6 through 9, it will be noted that the apparatus is supported on a base 54. A bracket 56 attached to base 54 supports a cylinder 44; namely, the cylinder 44 associated with the bungee cord punch 42. The bungee punch 42 is retained within the jig or fixture 24 which defines the passage 22 for receipt of the bungee cord. The passage 22 is positioned adjacent to die support plate 36 of the clipper. The die support plate 36, in turn, supports a cylinder assembly 58 which drives the punch 50 in the manner previously described. A manually actuated air control valve 60 is also mounted on the base 54. Actuation of the valve 60 will initiate sequential operation of the punch 42 into and out of engagement with the bungee cord 10 and then the subsequent operation of the clipper punch 50. The punch 50 is a typical punch, for example, of the type depicted in U.S. Pat. No. 2,880,419.

Figure 7:
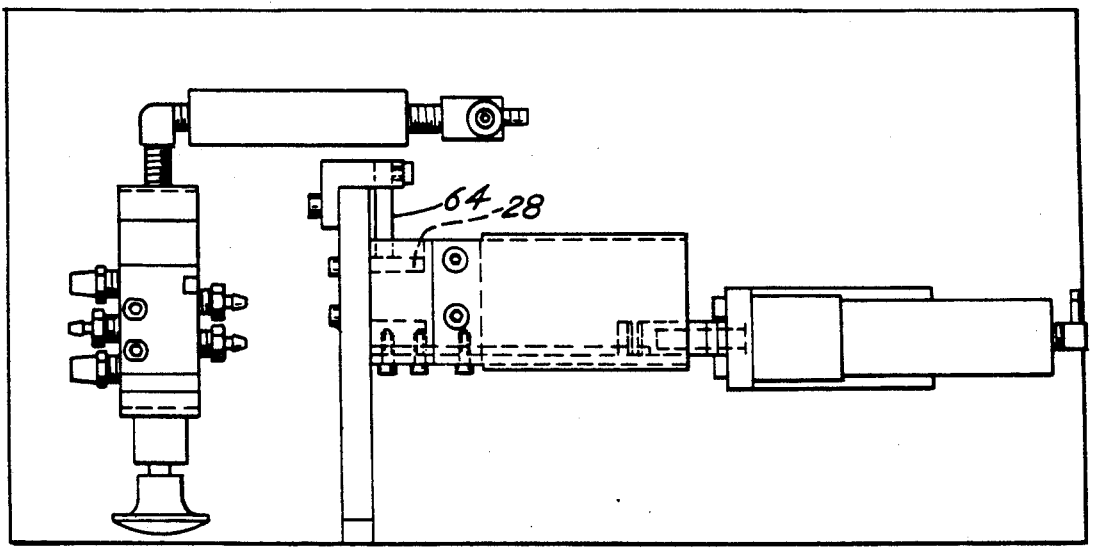
FIG. 7 is a top plan view of the improved apparatus of the invention.

FIG. 7 is a top plan view of the assemblage of parts previously discussed. It is to be noted that the back plate or back wall 28 which assists in defining the size of the passage 22 is adjustable. Thus, plate 28 is mounted on a bracket 64 which may be adjusted so as to adjust the depth of the opening 22 for the bungee cord which is folded over upon itself.

Figure 8:
FIG. 8 is a side view of the punch which is used to positioned the bungee cord within the clipper in accord with the method of the present invention.
Figure 9:
FIG. 9 is a top plan view of the punch of FIG. 8.

FIGS. 8 and 9 illustrate the construction of the punch 42 which is utilized to fold the end of the bungee cord 10 upon itself. The punch 42 includes a bungee cord engaging end 66 which is defined by arcuate opening or slot 68 that fits over the contour of the bungee cord 10. This enhances the folding operation of the bungee cord over itself. The end 66 as depicted in FIG. 9 is sufficiently narrow so as enhance to the folding over of the bungee cord 10 while at the same time ensuring that it will not cut the cord 10.

It is possible to vary the construction and steps of the invention. For example, the construction of the punch 42 may be varied. The specific orientation of the component parts may also be slightly varied without departing from the scope of the invention. In the embodiment shown, for example, the punch 42 is generally transverse to the legs of the clip 48 which slides in the channel 38. The punch 42 is also aligned to ensure that the bungee cord 10 will fit within the opening 46. The opening 46 is slightly enlarged so that the clip 48 can be removed easily once it is attached out the cord 10. Nonetheless, various changes in the configuration and construction of the invention are possible. Therefore, the invention is to be limited only by the following claims and their equivalents.

What is claimed is:

1. A bungee cord clipper comprising, in combination:
   a clipper including a support frame, a die plate on the frame, a die in the die plate, a piston driven punch mounted on the plate for driving a U-shaped metal clip into engagement with the die for forming the clip a throat through the die plate for receipt of material to be clipped, said throat comprising an opening through the plate with the sides of the opening defined by the legs of a U-shaped metal clip driven by the punch for engagement with the die;
   a bungee cord jig assembly adjacent one side of the clipper throat, said jig assembly including a bungee cord guide member having a passage for receipt of the end of a bungee cord, said passage extending beyond both sides of the throat opening and adjacent the throat opening, said passage being open on the side adjacent the throat;
   a bungee cord punch transverse to the passage and opposite the throat; and
   means for driving the bungee cord punch into engagement with a bungee cord extending into the passage to fold over the end of the cord and position the folded end into the throat, whereby the bungee cord punch is then withdrawn and the clipper punch engages a clip and effects attachment of the clip onto the folded end of the cord.

2. The clipper of claim 1 wherein the bungee cord punch has a shaped end for engaging the bungee cord.

3. The clipper of claim 2 wherein the shaped end is arcuate to accommodate the shape of a generally cylindrical bungee cord.

4. The clipper of claim 1 including means for adjusting the depth of the passage to thereby control the size of the folded end of the bungee cord.

5. The clipper of claim 1 including means to control the stroke of the bungee cord punch.

* * * * *